United States Patent [19]

Clémence et al.

[11] 3,817,999

[45] June 18, 1974

[54] -2-OXY-3-METHOXY-5-ALLYL-BENZAMIDES

[75] Inventors: Francois Clémence, Rosny-Sous-Bois; Odile Le Martret, Paris, both of France

[73] Assignee: Roussel UCLAF, Paris, France

[22] Filed: Sept. 28, 1971

[21] Appl. No.: 184,619

Related U.S. Application Data

[63] Continuation-in-part of Ser. No. 762,606, Sept. 25, 1968, Pat. No. 3,668,238, which is a continuation-in-part of Ser. No. 743,576, June 6, 1968, abandoned.

[30] Foreign Application Priority Data

June 6, 1967    France .......................... 67.109297
Sept. 6, 1967   France .......................... 67.120154

[52] U.S. Cl. 260/247.7 H, 260/247.2 B, 260/293.77, 260/326.3, 260/326.5 E, 424/248
[51] Int. Cl............................................. C07d 87/34
[58] Field of Search... 260/247.7 H, 326.3, 326.5 E, 260/293.77, 247.2 B

*Primary Examiner*—Donald G. Daus
*Assistant Examiner*—Jose Tovar
*Attorney, Agent, or Firm*—Hammond & Littell

[57] ABSTRACT

An amide of 2-hydroxy-3-methoxy-5-allyl-benzoic acid of the formula

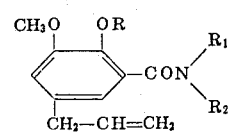

wherein R is selected from the group consisting of hydrogen, alkyl of 1 to 7 carbon atoms and acyl of an organic carboxylic acid of 1 to 18 carbon atoms, $R_1$ and $R_2$ taken together with the nitrogen atom form a heterocyclic which may contain another heteroatom, which products possess outstanding choleretic properties far superior to dehydrocholic acid.

4 Claims, No Drawings

2-OXY-3-METHOXY-5-ALLYL-BENZAMIDES

PRIOR APPLICATIONS

The present application is a C.I.P. of application of our copending, commonly assigned application Ser. No. 762,606 filed Sept. 25, 1968 now U.S. Pat. No. 3,668,238 which in turn is a continuation-in-part application Ser. No. 743,576 filed June 6, 1968, now abandoned.

OBJECTS OF THE INVENTION

It is an object of the invention to provide the novel benzamides of formula I.

It is an additional object of the invention to provide novel therapeutic compositions having a high choleretic activity.

It is a further object of the invention to provide a novel method of increasing bile secretion in warm-blooded animals.

These and other objects and advantages of the invention will become obvious from the following detailed description.

THE INVENTION

The novel benzamides of the invention have the formula

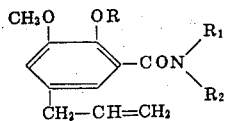

wherein R is selected from the group consisting of hydrogen, alkyl of 1 to 7 carbon atoms and acyl of an organic carboxylic acid of 1 to 18 carbon atoms, $R_1$ and $R_2$ taken together with the nitrogen atom form a heterocyclic which may contain another heteroatom, preferably a five to seven membered heterocyclic radical which may contain another heteroatom.

Examples of suitable compounds of formula I are:
2-hydroxy-3-methoxy-5-allyl-N-morpholinobenzamide;
2-hydroxy-3-methoxy-5-allyl-N-piperidinobenzamide;
2-hydroxy-3-methoxy-5-allyl-N-pyrrolidinobenzamide;

The novel process of the invention for the preparation of benzamides of formula I comprises condensing a nitrogen compound of the formula:

wherein $R_1$ and $R_2$ have the above definition with a carboxylic functional derivative of 2-hydroxy-3-methoxy-5-allyl-benzoic acid to form the corresponding benzamide which can be esterified or etherified in the two-position. The carboxylic acid functional derivative is preferably chosen from the group consisting of the acid halide such as chloride or bromide, the acid anhydride, a mixed acid anhydride and a lower alkyl ester. The mixed anhydride can be formed in situ from 2-hydroxy-3-methoxy-5-allyl-benzoic acid and a dialkylcarbodiimide.

A variation of the process of the invention comprises reacting 2-hydroxy-3-methoxy-5-allyl benzoic acid with an esterifying agent of an organic carboxylic acid of 1 to 18 carbon atoms to form the corresponding 2-acyloxy-3-methoxy-5-allyl-benzoic acid, converting the latter into a carboxylic acid functional derivative by reaction with a halogenating agent or a dehydrating agent, and reacting the latter with a nitrogen compound of formula II to form the corresponding 2-acyloxy-3-methoxy-5-allyl-benzamide which may be saponified to form the corresponding 2-hydroxy compound which can be etherified or esterified if desired.

Another variation of the process of the invention comprises reacting a carboxylic functional derivative of 2-hydroxy-3-methoxy-benzoic acid with a nitrogen compound of formula II to form the corresponding 2-hydroxy-3-methoxy-benzamide, reacting the latter with an allyl halide to form the corresponding 2-allyloxy-3-methoxy-benzamide and subjected the latter to a Claisen transformation to form the corresponding 2-hydroxy-3-methoxy-5-allyl-benzamide which can be esterified or etherified.

Examples of suitable organic acids of 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelargonic acid, capric acid, undecylic acid, lauric acid, myristic acid, palmitic acid and stearic acid; alkenoic acids, such as undecylenic acid and oleic acid; cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorphenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromo-furane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

The condensation of the nitrogen compound of formula II with 2-hydroxy-3-methoxy-5-allyl-benzoic acid derivative is preferably effected in the presence or absence of an inert organic solvent from 80° C to the reflux temperature of the specific nitrogen compound. When condensing the 2-acyloxy compound with the nitrogen compound of formula II, the functional derivative is preferably an acid halide and the reaction is effected in an inert solvent below 50° C in the presence of an acid acceptor.

Formation of the 2-allyloxy derivative is preferably effected with an allyl halide in the presence of an alkali agent and the Claisen transposition is preferably effected at 150° to 250° C.

The etherification of the 2-hydroxy-3-methoxy-5-allyl-benzamides is preferably effected with an alkyl halide or sulfate in an organic medium. The esterification of the said benzamides is preferably effected with an organic carboxylic acid halide in the presence of an alkali metal hydroxide.

The novel choleretic compositions of the invention consist of an effective amount of at least one benzamide of formula I, and a major amount of a pharmaceutical carrier. The said compositions may be in the form of injectable solutions or suspensions, tablets, coated tablets, cachets, capsules, aromatic powder, granules, emulsions and suppositories prepared in the usual manner. They contain preferably from 100 to 200 mg of the active compound.

The compositions are useful for the treatment of dyspeptic disturbances due to a biliary deficiency, hepatobiliary functional disturbances, alimentary intolerances, urticarias, pruritus, migraines and constipation of hepatic origin.

The novel method of the invention for increasing bile secretion in warm-blooded animals comprises administering to warm-blooded animals a safe and effective amount of at least one benzamide of formula I. The said amides are administered orally, transcutaneously or rectally. The usual useful daily dosage is 1 to 50 mg/kg depending upon the method of administration of the benzamide of formula I.

In the following examples there are described several preferred embodiments to illustrate the invention. However, it should be understood that the invention is not intended to be limited to the specific embodiments.

EXAMPLE I

Preparation of
2-hydroxy-3-methoxy-5-allyl-N-($\beta$-hydroxyethyl)-benzamide 36 g. of ethyl ester of 2-hydroxy-3-methoxy-5-allyl-benzoic acid (obtained by the process described by PEARL et al., J. Amer. Chem. Soc., Vol. 71, 1067–1068, 1949) and 61 g of ethanolamine were admixed and left to stand for 1 hour at ambient temperature after which it was heated for 1 hour at 120° C. The mixture was extracted with chloroform and the organic phases were washed with half diluted hydrochlorid acid, then with water, and the chloroform evaporated off. The residue, after recrystallization from benzene, was a 78 percent yield of 2-hydroxy-3-methoxy-5-allyl-N-($\beta$-hydroxyethyl)-benzamide having a melting point of 95° C. The product appeared in the form of colourless crystals which were insoluble in water and soluble in dilute sodium hydroxide.

| Analysis | $C_{13}H_{17}NO_4$; molecular weight = 251.27 | | |
|---|---|---|---|
| Calculated | C% 62.12 | H% 6.82 | N% 5.57 |
| Found | 62.4 | 6.8 | 5.6 |
| I. R. Spectrum - Nujol | | | |
| OH | at 3500 cm⁻¹ | | |
| NH | at 3320 cm⁻¹ | | |
| C O | at 1650 cm⁻¹ | | |
| CH CH₂ | at 905 and 985 cm⁻¹ | | |
| U. V. spectrum - ethanol | | | |
| $\lambda$ max. | at 316 and 218 m$\mu$ | | |
| Shoulder | at 250 m$\mu$ | | |
| $\lambda$ min. | at 275 m$\mu$ | | |

As far as is known, this compound is not described in the literature.

EXAMPLE II

Step A: Preparation of 2-hydroxy-3-methoxy-N-($\beta$-hydroxyethyl)-benzamide 14.4 g of the ethyl ester of 2-hydroxy-3-methoxy-benzoic acid and 30 cc of monoethanolamine were admixed and heated for 1 hour at 120° C. The mixture was extracted with chloroform and the organic phases were washed with dilute hydrochloric acid. Evaporation of the solvent gave 12.8 g. (82 percent yield) of 2-hydroxy-3-methoxy-N-($\beta$-hydroxyethyl)-benzamide having a melting point of 97° C and occurring in the form of colourless crystals insoluble in water and soluble in dilute sodium hydroxide.

Analysis: $C_{10}H_{13}NO_4$; molecular weight = 211.21

| | |
|---|---|
| Calculated | N% 6.64 |
| Found | 6.69 |

As far as is known, this compound is not described in the literature.

Step B: Preparation of 2-hydroxy-3-methoxy-5-allyl-N-($\beta$-hydroxyethyl)-benzamide 12 g. of 2-hydroxy-3-methoxy-N-($\beta$-hydroxy-ethyl)-benzamide, 7.6 g of allyl bromide, 7.87 g of potassium carbonate in 12 cc of acetone, were admixed and heated at reflux for 8 hours. After the addition of 50 cc of water, the mixture was extracted with chloroform and the organic phases were washed with 1N sodium hydroxide and distilled in vacuo. The crude 2-allyloxy-3-methoxy-N-($\beta$-hydroxyethyl)-benzamide thus obtained was heated gradually to 200° C and maintained at reflux for 30 minutes. Dilute sodium hydroxide was added thereto and the mixture was extracted with chloroform. The alkaline phase was acidified with dilute hydrochloric acid and extracted with chloroform. After evaporation of the solvent, the residue was crystallized from ether to obtain 2-hydroxy-3-methoxy-5-allyl-N-($\beta$-hydroxyethyl)-benzamide with a melting point of 95° C.

As far as is known, 2-allyloxy-3-methoxy-N-($\beta$-hydroxyethyl)-benzamide is not described in the literature.

EXAMPLE III

Preparation of
2,3-dimethoxy-5-allyl-N-($\beta$-hydroxyethyl)-benzamide 20 g. of 2-hydroxy-3-methoxy-5-allyl-N-($\beta$-hydroxyethyl)-benzamide (obtained in example I) were dissolved in 120 cc of N sodium hydroxide and after heating to 40° C, 20.05 g. of methyl sulphate were added thereto while maintaining an alkaline pH by adding N sodium hydroxide. The mixture stood for 1 hour, then was filtered and the precipitate was recrystallized from ethyl acetate to obtain 2,3-dimethoxy-5-allyl-N-($\beta$-hydroxyethyl)-benzamide in a yield of 60 percent and having a melting point of 74° C.

The product appeared in the form of colourless crystals which were insoluble in water and dilute sodium hydroxide.
Analysis: $C_{14}H_{19}NO_4$; molecular weight = 265.29

| | |
|---|---|
| Calculated | N% 5.28 |
| Found | 5.36 |

I. R. Spectrum — Nujol
Absence of OH

As far as is known, this compound is not described in the literature.

EXAMPLE IV

Preparation of 2-hydroxy-3-methoxy-5-allyl-N-($\beta$-hydroxypropyl)-benzamide

A mixture of 10.5 g. of isopropanolamine and 5 g. of the ethyl ester of 2-hydroxy-3-methoxy-benzoic acid were heated at 130° C for one hour and the solution thus obtained was extracted with chloroform. The organic phases were washed with 6N hydrochloric acid, then with water and evaporated to dryness to obtain a yield of 55 percent of 2-hydroxy-3-methoxy-5-allyl-N($\beta$-hydroxypropyl)-benzamide having a melting point of 86° C.

The product appeared in the form of colourless crystals soluble in dilute sodium hydroxide and insoluble in water.
Analysis: $C_{14}H_{19}NO_4$; molecular weight = 265.29

| | |
|---|---|
| Calculated | N% 5.28 |
| Found | 5.36 |

As far as is known, this compound is not described in the literature.

EXAMPLE V

Preparation of 2-hydroxy-3-methoxy-5-allyl-N-morpholino-benzamide 25 g. of the ethyl ester of 2-hydroxy-3-methoxy-5-allylbenzoic acid and 61 g. of morpholine were heated at reflux for 4 hours and then the excess morpholine was distilled off under reduced pressure. The residue was extracted with chloroform and the organic phases were washed with dilute hydrochloric acid, then with water. After distilling off the chloroform, the residue was washed with ether and crystallized from isopropyl ether to obtain a 65 percent yield of 2-hydroxy-3-methoxy-5-allyl-N-morpholinobenzamide having a melting point of 108° C.

The product appeared in the form of colorless crystals insoluble in water and soluble in dilute sodium hydroxide.
Analysis: $C_{15}H_{19}NO_4$; molecular weight = 277.30

| | |
|---|---|
| Calculated | N% 5.05 |
| Found | 5.10 |

As far as is known this compound is not described in the literature.

EXAMPLE VI

Preparation of 2-hydroxy-3-methoxy-5-allyl-N-piperidinobenzamide

A mixture of 25 g. of the ethyl ester of 2-hydroxy-3-methoxy-5-allylbenzoic acid and 60 g. of piperidine were heated at reflux for three hours and then the excess piperidine was distilled off under reduced pressure. The residue was extracted with chloroform and the organic phases were washed with dilute hydrochloric acid, then with water and evaporated to dryness. The resulting residue was recrystallized from isopropyl ether to obtain a 65.5 percent yield of 2-hydroxy-3-methoxy-5-allyl-N-piperidinobenzamide having a melting point of 90° C and occurring in the form of colourless crystals.
Analysis: $C_{16}H_{21}NO_3$; molecular weight = 275.33

| | |
|---|---|
| Calculated | N% 5.08 |
| Found | 5.15 |

As far as is known, this compound is not described in the literature.

EXAMPLE VII

Preparation of 2-hydroxy-3-methoxy-5-allyl-N-pyrrolidinobenzamide

A mixture of 25 g. of the ethyl ester of 2-hydroxy-3-methoxy-5-allylbenzoic acid and 50 g. of pyrrolidine were heated at reflux for three hours and after distilling off the excess amine, the residue was extracted with chloroform. The organic phases were washed with dilute hydrochloric acid, then water and evaporated to dryness. The residue was crystallized from acetone to obtain 16.17 g (Yield 58.5 percent) of 2-hydroxy-3-methoxy-5-allyl-N-pyrrolidinobenzamide, in the form of colorless crystals, melting at 154° C.
Analysis: $C_{15}H_{19}NO_3$; molecular weight = 261.31

| | | | |
|---|---|---|---|
| Calculated | C% 68.94 | H% 7.32 | N% 5.36 |
| Found | 69.00 | 7.20 | 5.50 |

As far as is known, this compound is not described in the literature.

EXAMPLE VIII

Preparation of 2-hydroxy-3-methoxy-5-allylbenzanilide

Step A: 2-acetoxy-3-methoxy-5-allylbenzoic acid 35 g. of 2-hydroxy-3-methoxy-5-allylbenzoic acid, (Scheuch Liebigs Annalen der Chemie Vol. 125, pg. 17), were suspended in 32 cc of acetic anhydride and after the addition of a few drops of sulphuric acid, the mixture was heated at 50°–60° for 15 minutes. After cooling, 33 cc of water were added to the mixture which was allowed to stand for two hours before extracting with ether. The ether extracted was evaporated to dryness and the residue crystallized from benzene to obtain a yield of 74.5 percent of 2-acetoxy-3-methoxy-5-allylbenzoic acid in the form of colorless crystals melting at 127° C.
Analysis: $C_{13}H_{14}O_5$; molecular weight = 250.26
Test with iron perchloride: negative (absence of phenol)

As far as is known, this compound is not described in the literature.

Step B: 2-acetoxy-3-methoxy-5-allylbenzoic acid chloride:

10 g. of 2-acetoxy-3-methoxy-5-allyl-benzoic acid were dissolved in 40 cc of thionyl chloride and heated at reflux until the end of gas evolution. The excess thionyl chloride was eliminated and the residue distilled at reduced pressure produced an oil boiling at 160°–161° C under 2 mm of mercury which slowly crystallized to obtain a yield of 62 percent of 2-acetoxy-3-methoxy-5-allylbenzoic acid chloride melting at 50° C.

Analysis: $C_{13}H_{13}ClO_4$; molecular weight = 268.57

| | | |
|---|---|---|
| Calculated | Cl% | 13.19 |
| Found | | 13.22 |

As far as is known, this compound is not described in the literature.

Step C: 2-acetoxy-3-methoxy-5-allylbenzanilide

A mixture of 2.63 g. of triethylamine and 2.15 g of aniline in 25 cc of acetone were added to a solution of 6.37 g. of 2-acetoxy-3-methoxy-5-allylbenzoic acid chloride in 25 cc of acetone while maintaining the temperature between +10° C and +15° C. The resulting mixture was stirred at ambient temperature for 2½ hours and then was filtered. After evaporating off the acetone, the residue was crystallized from alcohol to obtain a yield of 60 percent of 2-acetoxy-3-methoxy-5-allylbenzanilide.

The product appeared in the form of colourless crystals, insoluble in water and dilute sodium hydroxide.

Analysis: $C_{19}H_{19}NO_4$; molecular weight = 325.19

| | |
|---|---|
| Calculated | N% |
| Found | 4.34–4.32 |

As far as is known, this compound is not described in the literature.

Step C: 2-hydroxy-3-methoxy-5-allylbenzanilide 1.62 g of 2-acetoxy-3-methoxy-5-allylbenzanilide were dissolved in an excess of 0.4 N methanolic potassium hydroxide and after standing for 15 minutes, the pH was adjusted to 7 by adding N/10 hydrochloric acid thereto. The methanol was distilled off and the residue was dissolved in water and the solution acidified to pH of 1 and extracted with chloroform. The organic phases were washed with water, evaporated to dryness and the residue was crystallized from alcohol to obtain 2-hydroxy-3-methoxy-5-allylbenzanilide melting at 140° C and in the form of colorless crystals, insoluble in water and soluble in dilute sodium hydroxide.

Analysis: $C_{17}H_{17}NO_3$; molecular weight = 283.31

| | |
|---|---|
| Calculated | N% |
| Found | 5.04–5.02 |

As far as is known, this compound is not described in the literature.

EXAMPLE IX

Preparation of
2-hydroxy-3-methoxy-5-allyl-N-n-propylbenzamide

Step A: 2-acetoxy-3-methoxy-5-allyl-N-n-propylbenzamide

To a solution of 3.6 g of 2-acetoxy-3-methoxy-5-allylbenzoic acid chloride, obtained in Step B of Example VIII and 1.1 g of triethylamine in 25 cc of acetone, a solution of 0.86 g of n-propylamine in 25 cc of acetone was slowly added while maintaining the temperature between +10° and +15° C. The solution was filtered and the filtrate was evaporated to dryness under reduced pressure. The residue was crystallized from isopropyl ether to obtain a yield of 61 percent of 2-acetoxy-3-methoxy-5-allyl-N-n-propylbenzamide. The product appeared in the form of colorless crystals insoluble in dilute sodium hydroxide and melting at 90° C.

Analysis: $C_{16}H_{21}NO_4$; molecular weight = 291.34

| | | |
|---|---|---|
| Calculated | N% | 4.80 |
| Found | | 4.80 |

As far as is known, this compound is not described in the literature.

Step B: 2-hydroxy-3-methoxy-5-allyl-N-n-propylbenzamide.

1 g of 2-acetoxy-3-methoxy-5-allyl-N-n-propylbenzamide was dissolved in an excess of 0.9 N methanolic potassium hydroxide and after standing for 30 minutes, the pH was adjusted to 7 by adding dilute hydrochloric acid thereto. After evaporation of the methanol, the residue was dissolved in water, and hydrochloric acid was added. The solution was extracted with chloroform and the organic phases were washed with water and distilled to dryness to obtain an amorphous product which upon re-crystallization from isopropyl ether gave 0.51 g of 2-hydroxy-3-methoxy-5-allyl-N-n-propylbenzamide (yield: 60 percent) in the form of colorless crystals and melting at 95° C, insoluble in water and soluble in dilute sodium hydroxide.

Analysis: $C_{14}H_{19}NO_3$; molecular weight = 249.29

| | | |
|---|---|---|
| Calculated | N% | 5.61 |
| Found | | 5.56 |

As far as is known this compound is not described in the literature.

EXAMPLE X

Preparation of
2-hydroxy-3-methoxy-5-allyl-N-cyclohexylbenzamide

Step A: 2-acetoxy-3-methoxy-5-allyl-N-cyclohexylbenzamide

Using the process of Step A of Example IX, 5.57 g of 2-acetoxy-3-methoxy-5-allylbenzoic acid chloride, 2.25 g of cyclohexylamine, 2.29 g. of triethylamine and 50 cc of acetone give after recrystallization from isopropyl ether 3.03 g (yield: 44 percent) of 2-acetoxy-3-methoxy-5-allyl-N-cyclohexylbenzamide in the form of colorless crystals, insoluble in water and dilute sodium hydroxide and melting at 100° C.

Analysis: $C_{19}H_{25}NO_4$; molecular weight 331.40

| | | |
|---|---|---|
| Calculated | N% | 4.22 |
| Found | | 4.45 |

As far as is known, this compound is not described in the literature.

Step B: 2-hydroxy-3-methoxy-5-allyl-N-cyclohexylbenzamide

Using the process of Step B of Example IX, 1 g. of 2-acetoxy-3-methoxy-5-allyl-N-cyclohexylbenzamide gave after crystallization from isopropyl ether, 0.45 g. (51.5 percent yield) of 2-hydroxy-3-methoxy-5-allyl-N-cyclohexylbenzamide in the form of colorless crystals insoluble in water and soluble in dilute sodium hydroxide and melting at 132° C.

Analysis: $C_{17}H_{23}NO_3$; molecular weight = 289.35

|  | N% |
|---|---|
| Calculated | 4.84 |
| Found | 4.84 |

As far as is known, this compound is not described in the literature.

EXAMPLE XI

Preparation of 2-hydroxy-3-methoxy-5-allyl-N-diethylbenzamide

Step A: 2-hydroxy-3-methoxy-N-diethylbenzamide 16.81 g of 2-hydroxy-3-methoxybenzoic acid were dissolved in 400 cc of acetone and 30.35 g of triethylamine and then 22 cc of ethyl chloroformate were added thereto. The solution was filtered to remove the triethylamine hydrochloride thus formed and 14.63 g of diethylamine were added thereto, the solution stood for about 12 hours.

The acetone was distilled off and the residue was dissolved in N potassium hydroxide in ethanol and after standing for about 12 hours' contact, the solution was filtered. The ethanolic solution was acidified with N hydrochloric acid, and then evaporated under reduced pressure. The residue was dissolved in ether, washed with water and evaporated off to dryness to obtain a 43 percent yield of 2-hydroxy-3-methoxy-N-diethylbenzamide which occurred after crystallization from isopropyl ether, in the form of colourless crystals melting at 86° C.

Analysis: $C_{12}H_{17}NO_3$; molecular weight = 223.26

|  | N% |
|---|---|
| Calculated | 6.27 |
| Found | 6.30 |

As far as is known, this compound is not described in the literature.

Step B: 2-allyloxy-3-methoxy-N-diethylbenzamide

A suspension of 9.6 g of 2-hydroxy-3-methoxy-N-diethylbenzamide, 5.71 g of allyl bromide and 5.93 g of potassium carbonate in 50 cc of acetone was refluxed for 8 hours after which the acetone was distilled off in vacuo. The residue was dissolved in ether and washed with N sodium hydroxide and then water. After evaporating off the ether, a residual oil was distilled and the fraction (8 g.) boiling between 137° and 139° C under a pressure of 0.3 mm was collected which was 2-allyloxy-3-methoxy-N-diethylbenzamide.

Analysis: $C_{15}H_{21}NO_3$; molecular weight = 263.32

|  | N% |
|---|---|
| Calculated | 5.31 |
| Found | 5.30 |

As far as is known, this compound is not described in the literature.

Step C: 2-hydroxy-3-methoxy-5-allyl-N-diethylbenzamide.

8 g of 2-allyloxy-3-methoxy-N-diethylbenzamide produced in step B were gradually heated to 210° C and maintained for half an hour at this temperature. After cooling, the product was extracted with N sodium hydroxide which was acidified with dilute hydrochloric acid and extracted with ether. The oil obtained after evaporating off the ether was distilled under low pressure to collect the fraction boiling between 155° and 165° C under a pressure of 0.4 mm. This was a 25 percent yield of 2-hydroxy-3-methoxy-5-allyl-N-diethylbenzamide.

Analysis: $C_{15}H_{21}NO_3$; molecular weight = 263.32

|  | N% |
|---|---|
| Calculated | 5.31 |
| Found | 5.26 |

As far as is known, this compound is not described in the literature.

EXAMPLE XII

Preparation of 2-hydroxy-3-methoxy-5-allyl-N-($\alpha$, $\alpha$-dimethyl-$\beta$-hydroxyethyl)-benzamide 30 g of the ethyl ester of 2-hydroxy-3-methoxy-5-allylbenzoic acid were slowly added to 74.8 g of 2-amino-2-methyl-1-hydroxypropane and the mixture was heated for 1 hour at 130° C. After cooling, the mixture was extracted with chloroform and the organic phase was washed with dilute hydrochloric acid, then with water and the chloroform was evaporated off under low pressure to obtain crystals which were recrystallized from isopropyl ether, to obtain a 57 percent yield of 2-hydroxy-3-methoxy-5-allyl-N-($\alpha,\alpha$-dimethyl-$\beta$-hydroxyethylbenzamide in the form of colorless crystals and melting at 98° C (yield: 57 percent).

Analysis: $C_{15}H_{21}NO_4$; molecular weight = 279.32

|  | N% |
|---|---|
| Calculated | 5.01 |
| Found | 5.03 |

As far as is known, this compound is not described in the literature.

EXAMPLE XIII

Preparation of 2-acetoxy-3-methoxy-5-allyl-N-($\beta$-acetoxyethyl)-benzamide

A few drops of concentrated sulfuric acid were added to 17.96 g of 2-hydroxy-3-methoxy-5-allyl-N-($\beta$-hydroxyethyl)-benzamide (prepared in Example I) in suspension in 22 cc of acetic anhydride, while maintaining the temperature at about 20° C and the mixture was agitated for 30 minutes at ambient temperature and 15 minutes at 60° C. After the addition of 30 cc of water, the mixture stood for two hours and was then extracted with chloroform. After washing the extracts with water and evaporating off the chloroform, crystals were obtained which when recrystallized from 50 percent ethanol give a 70 percent yield of 2-acetoxy-3-methoxy-5-allyl-N-($\beta$-hydroxyethyl)-benzamide in the form of colorless crystals and melting at 94° C. (Yield 70 percent).

Analysis: $C_{17}H_{21}NO_6$; molecular weight = 335.24

|  | N% |
|---|---|
| Calculated | 4.17 |
| Found | 4.12 |

As far as is known, this compound is not described in the literature.

EXAMPLE XIV

Preparation of
2-hydroxy-3-methoxy-5-allyl-N-pyrrolidino-benzamide

Step A: 2-hydroxy-3-methoxy-N-pyrrolidino-benzamide

A mixture of 25 g. of the ethyl ester of 2-hydroxy-3-methoxy-benzoic acid and 60 g. of pyrrolidine were heated at reflux for 3 hours and then the excess pyrrolidine was distilled off in vacuo. The residue was dissolved in chloroform which was washed with dilute hydrochloric acid and evaporated to dryness in vacuo and the residue after crystallization from ethyl acetate gave 19.7 g. (70 percent yield) of colorless crystals melting at 124° C which was 2-hydroxy-3-methoxy-N pyrrolidino-benzamide.

Analysis: $C_{12}H_{15}NO_3$; molecular wieght 221.26

| | |
|---|---|
| Calculated | N% 6.33 |
| Found | 6.25 |

As far as is known, this compound is not described in the literature.

Step B: 2-hydroxy-3-methoxy-5-allyl-N-pyrrolidino-benzamide

A mixture of 17.20 g of 2-hydroxy-3-methoxy-N-pyrrolidinobenzamide, 11.0 g of allyl bromide and 11.1 g of potassium carbonate in 18 cc of acetone was heated at reflux for eight hours and after the addition of 75 cc of water, the mixture was extracted with chloroform. The organic phases were washed with N-sodium hydroxide and distilled in vacuo. The crude 2-allyloxy-3-methoxy-N-pyrrolidino-benzamide thus obtained was heated gradually to 200°C and held at reflux for 30 minutes. After cooling, dilute sodium hydroxide was added thereto and the mixture was extracted with chloroform. The alkaline phase was acidified with dilute hydrochloric acid and extracted with chloroform. After evaporating off the chloroform, the residue was crystallized from acetone to obtain a 25 percent yield of colorless crystals, melting at 154° C. The product was identical with that obtained in Example VII.

As far as is known, 2-allyloxy-3-methoxy-N-pyrrolidinobenzamide is not described in the literature.

EXAMPLE XV

Preparation of
2-hydroxy-3-methoxy-5-allyl-benzamide

Step A: Ethyl ester of 2-benzyloxy-3-methoxy-benzoic acid 14 g. of ethyl ester of 2-hydroxy-3-methoxy-benzoic acid were introduced into a solution of 1.62 g. of sodium in 100 cc of absolute alcohol and after filtering off the sodium phenolate thus formed, the product was dried and dissolved in 310 cc of dimethylformamide. 9.88 g. of benzyl chloride were added to the solution thus obtained and then heated at 120° C for 2 hours. After cooling, the mixture was filtered and evaporated off to dryness. The residue was dissolved in ether and the etheral solution was washed with dilute sodium hydroxide, then with water and evaporated to dryness to obtain a 75.5 percent yield of the ethyl ester of 2-benzyloxy-3-methoxy-benzoic acid in the form of an oil which distilled at 176°–180° C under 0.4 mm.

Analysis: $C_{17}H_{18}O_4$; molecular weight = 286.31
Molecular weight found: 288.2

Step B: 2-benzyloxy-3-methoxy-benzoic acid

The ethyl ester of 2-benzyloxy-3-methoxy-benzoic acid obtained in Step A was saponified by refluxing for 30 minutes in alcoholic potassium hydroxide. After cooling, a 62 percent yield of crystals of 2-benzyloxy-3-methoxy-benzoic acid was obtained which were recrystallized from isopropyl ether. The colorless crystals thus formed melt at 90° C.

Analysis: $C_{15}H_{14}O_4$; molecular weight = 258.26
Molecular weight found: 257.5

Step C: 2-benzyloxy-3-methoxy-benzamide 7 g. of 2-benzyloxy-3-methoxy-benzoic acid were reacted with 3.55 g. of thionyl chloride dissolved in 70 cc of chloroform by heating at reflux for two hours and then distilling off the solvent under reduced pressure. The crude acid chloride was introduced into 50 cc of concentrated ammonia and crystals thus formed were filtered off and recrystallized from ether to obtain a 32 percent yield of colorless crystals of 2-benzyloxy-3-methoxy-benzamide melting at 70° C.

Analysis: $C_{15}H_{15}NO_3$; molecular weight = 257.27

| | |
|---|---|
| Calculated | N% 5.44 |
| Found | 5.57 |

Step D: 2-hydroxy-3-methoxy-benzamide 2.57 g. of 2-benzyloxy-3-methoxy-benzamide dissolved in 50 cc of absolute alcohol were hydrogenated for a few minutes in the presence of 0.5 g. of animal charcoal. After filtering and evaporating off the alcoholic solvent, the product thus obtained was recrystallized from isopropanol to obtain 2-hydroxy-3-methoxy-benzamide in the form of colorless crystals melting at 154° C. (Yield: 70 percent).

Analysis: $C_8H_9NO_3$; molecular weight

| | |
|---|---|
| Calculated | N% 8.37 |
| Found | 8.58 |

As far as is known, this compound is not described in the literature.

Step E: 2-allyloxy-3-methoxy-benzamide 1.71 g of 2-hydroxy-3-methoxybenzamide, 1.41 g of potassium carbonate and 1.45 g of allyl bromide were suspended in 12 cc of acetone and the mixture was heated at reflux for eight hours. Then, the acetone was evaporated off in vacuo and the residue was dissolved in water and extracted with ether. The ethereal solution was washed with N sodium hydroxide and with water, then evaporated in vacuo to obtain a 95.5 percent yield of colorless crystals of 2-allyloxy-3-methoxy-benzamide, melting at 80° C. The product was insoluble in water and dilute sodium hydroxide.

Analysis: $C_{11}H_{13}NO_3$; molecular weight = 207.21

| | |
|---|---|
| Calculated | N% 6.76 |
| Found | 6.75 |

As far as is known, this compound is not described in the literature.

Step F: 2-hydroxy-3-methoxy-5-allyl-benzamide 1 g of 2-allyloxy-3-methoxy-benzamide was heated at 200° C for 20 minutes to obtain a 30 percent yield of 2-hydroxy-3-methoxy-5-allyl-benzamide in the form of colorless crystals after cooling and recrystallization from benzene which melts at 142° C.

Analysis: $C_{11}H_{13}NO_3$; molecular weight = 207.21

| | N% |
|---|---|
| Calculated | 6.76 |
| Found | 6.80 |

As far as is known, this compound is not described in the literature.

PHARMACOLOGICAL STUDY

A. Choreretic Activity on Rats introduodenally at

The choloretic activity of 2-hydroxy-3-methoxy-5-allyl-N-(β-hydroxyethyl)-benzamide was compared with sodium dehydrocholate under similar experimental conditions and dosages on rats. Groups of six male rats having an average body weight of 250 to 300 gm were anesthestized with urethane and their hepatic duct was catheterized. The test compounds in aqueous suspension were administered introduodenally at doses of 25 and 50 mg/kg. The rate of bile flow was measured 30 and 60 minutes before the administration of the test compounds and every half hour for the following 3 hours. The results are shown in Tables I to IV.

TABLE I 25 mg/kg 2-hydroxy-3-methoxy-5-allyl-N-(β-hydroxyethyl)-benzamide

| | Rate of Bile Flow in cc per 30 Minutes | | | | | | | |
|---|---|---|---|---|---|---|---|---|
| | Minutes before | | Minutes after administration of product | | | | | |
| Animals | 30 | 60 | 30 | 60 | 90 | 120 | 150 | 180 |
| 1 | 0.35 | 0.45 | 0.75 | 0.75 | 0.60 | 0.60 | 0.45 | dead |
| 2 | 0.50 | 0.40 | 0.60 | 0.55 | 0.50 | 0.50 | 0.50 | 0.50 |
| 3 | 0.45 | 0.40 | 0.60 | 0.50 | 0.50 | 0.40 | 0.40 | 0.35 |
| 4 | 0.25 | 0.20 | 0.35 | 0.35 | 0.30 | 0.30 | 0.35 | 0.25 |
| 5 | 0.20 | 0.20 | 0.30 | 0.30 | 0.20 | 0.20 | 0.20 | 0.15 |
| 6 | 0.20 | 0.35 | 0.70 | 0.55 | 0.40 | 0.35 | 0.35 | 0.35 |
| Average | 0.33 | | 0.55 | 0.50 | 0.42 | 0.39 | 0.37 | 0.32 |
| Percentage of Variation | | | +67% | +51% | +27% | +18% | +12% | −3% |

TABLE II 50 mg/kg 2-hydroxy-3-methoxy-5-allyl-N-(β-hydroxyethyl)-benzamide

| | Rate of Biliary Flow in ml per 30 Min | | | | | | | |
|---|---|---|---|---|---|---|---|---|
| Before | Minutes | | Minutes after Administration of the Product | | | | | |
| Animals | 30 | 60 | 30 | 60 | 90 | 120 | 150 | 180 |
| 1 | 0.40 | 0.35 | 0.70 | 0.50 | 0.45 | 0.40 | 0.40 | 0.40 |
| 2 | 0.25 | 0.25 | 0.50 | 0.45 | 0.45 | 0.30 | 0.30 | 0.30 |
| 3 | 0.35 | 0.30 | 0.60 | 0.55 | 0.60 | 0.30 | 0.40 | 0.40 |
| 4 | 0.30 | 0.25 | 0.60 | 0.50 | 0.60 | 0.35 | 0.35 | 0.40 |
| 5 | 0.40 | 0.30 | 0.80 | 0.65 | 0.35 | 0.35 | 0.30 | 0.30 |
| 6 | 0.35 | 0.30 | 0.40 | 0.40 | 0.40 | 0.40 | 0.40 | 0.30 |
| Average | 0.32 | | 0.60 | 0.51 | 0.47 | 0.35 | 0.36 | 0.35 |
| Percentage of Variation | | | +87% | +59% | +48% | +9% | +12% | +9% |

TABLE III 25 mg/kg SODIUM DEHYDROCHOLATE

| | Rate of Biliary Flow in ml per 30 Min. | | | | | | | |
|---|---|---|---|---|---|---|---|---|
| Before | Minutes | | Minutes after Administration of the Product | | | | | |
| Animals | 30 | 60 | 30 | 60 | 90 | 120 | 150 | 180 |
| 1 | 0.25 | 0.30 | 0.60 | 0.45 | 0.50 | 0.50 | 0.45 | 0.45 |
| 2 | 0.45 | 0.35 | 0.40 | 0.45 | 0.40 | 0.35 | 0.35 | 0.35 |
| 3 | 0.40 | 0.40 | 0.50 | 0.50 | 0.45 | 0.45 | 0.40 | 0.40 |
| 4 | 0.40 | 0.45 | 0.55 | 0.45 | 0.45 | 0.45 | 0.40 | 0.40 |
| 5 | 0.55 | 0.30 | 0.60 | 0.45 | 0.35 | 0.35 | 0.35 | 0.35 |
| 6 | 0.45 | 0.35 | 0.60 | 0.45 | 0.45 | 0.40 | 0.40 | 0.40 |
| Average | 0.39 | | 0.54 | 0.46 | 0.43 | 0.42 | 0.39 | 0.39 |
| Percentage of variation | | | +38% | +18% | +10% | +8% | 0 | 0 |

TABLE IV 50 mg/kg SODIUM DEHYDROCHOLATE

| | Rate of Biliary Flow in ml per 30 min | | | | | | | |
|---|---|---|---|---|---|---|---|---|
| Before | Minutes | | Minutes after Administration of the Product | | | | | |
| Animals | 30 | 60 | 30 | 60 | 90 | 120 | 150 | 180 |
| 1 | 0.50 | 0.40 | 0.75 | 0.55 | 0.55 | 0.55 | 0.50 | 0.50 |
| 2 | 0.40 | 0.40 | 0.45 | 0.50 | 0.45 | 0.40 | 0.40 | 0.40 |
| 3 | 0.40 | 0.45 | 0.60 | 0.55 | 0.45 | 0.35 | 0.35 | 0.35 |
| 4 | 0.20 | 0.30 | 0.65 | 0.40 | 0.35 | 0.25 | 0.25 | 0.25 |
| 5 | 0.30 | 0.30 | 0.60 | 0.40 | 0.40 | 0.25 | 0.25 | 0.25 |
| 6 | 0.40 | 0.40 | 0.60 | 0.40 | 0.30 | 0.30 | 0.35 | 0.30 |
| Average | 0.37 | | 0.61 | 0.47 | 0.42 | 0.35 | 0.35 | 0.34 |
| Percentage of Variation | | | +65% | +27% | +13% | −5% | −5% | −9% |

B. Choleretic Activity of 2-hydroxy-3-methoxy-5-allyl-N-morpholino-benzamide on rats:

2-hydroxy-3-methoxy-5-allyl-N-morpholino-benzamide administered under the same experimental circumstances as in A at a dosage of 50 mg/kg provided the results shown in Table V.

TABLE V 50 mg/kg 2-hydroxy-3-methoxy-5-allyl-N-morpholino-benzamide

| | Rate of Biliary Flow in ml per 30 min | | | | | | | |
|---|---|---|---|---|---|---|---|---|
| | Minutes Before | | Minutes after Administration of the Product | | | | | |
| Animals | 30 | 60 | 30 | 60 | 90 | 120 | 150 | 180 |
| 1 | 0.30 | 0.20 | 0.40 | 0.35 | 0.35 | 0.25 | 0.25 | 0.25 |
| 2 | 0.45 | 0.35 | 0.45 | 0.40 | 0.40 | 0.40 | 0.40 | 0.40 |
| 3 | 0.40 | 0.35 | 0.70 | 0.75 | 0.40 | 0.40 | 0.40 | 0.40 |
| 4 | 0.40 | 0.45 | 0.70 | 0.55 | 0.50 | 0.35 | 0.35 | 0.35 |
| 5 | 0.40 | 0.35 | 0.55 | 0.55 | 0.50 | 0.50 | 0.50 | 0.50 |
| 6 | 0.25 | 0.25 | 0.30 | 0.35 | 0.30 | 0.20 | 0.20 | 0.25 |
| Average | 0.34 | | 0.52 | 0.49 | 0.41 | 0.35 | 0.35 | 0.36 |
| Percentage of variation | | | +53% | +44% | +20% | +3% | +3% | +6% |

C. Oral Choleretic Activity

The oral choleretic activity of 2-hydroxy-3-methoxy-5-allyl-N-($\beta$-hydroxyethyl)-benzamide and sodium dehydrocholate was determined with the method of Boncard et al (Ann. Pharm. Fr., Vol. 21, 1963, No. 7–8). To avoid permanent anesthesia which causes a decline of intestinal movement, the rats having an average body weight of 250–300 gm were anesthetized for several minutes with ether to permit catheterization of the hepatic duct. The test products in aqueous suspension were administered orally with an esophageal probe at doses of 25 and 50 mg/kg and the bile flow was measured as in A. The results are shown in Tables VI to IX.

TABLE VI 25 mg/kg 2-hydroxy-3-methoxy-5-allyl-N-($\beta$-hydroxyethyl) benzamide

| | Rate of Biliary Flow in ml per 30 Min | | | | | | | |
|---|---|---|---|---|---|---|---|---|
| | Minutes Before | | Minutes After Administration of the Product | | | | | |
| Animals | 30 | 60 | 30 | 60 | 90 | 120 | 150 | 180 |
| 1 | 0.50 | 0.40 | 0.45 | 0.55 | 0.40 | 0.40 | 0.30 | 0.30 |
| 2 | 0.40 | 0.20 | 0.35 | 0.30 | 0.30 | 0.45 | 0.45 | 0.30 |
| 3 | 0.30 | 0.40 | 0.40 | 0.65 | 0.50 | 0.50 | 0.50 | 0.50 |
| 4 | 0.30 | 0.30 | 0.40 | 0.45 | 0.45 | 0.45 | 0.35 | 0.35 |
| 5 | 0.45 | 0.40 | 0.55 | 0.50 | 0.50 | 0.50 | 0.50 | 0.50 |
| 6 | 0.20 | 0.20 | 0.30 | 0.35 | 0.35 | 0.25 | 0.20 | 0.20 |
| Average | 0.34 | | 0.41 | 0.47 | 0.42 | 0.42 | 0.38 | 0.36 |
| Percentage of Variation | | | +21% | +38% | +23% | +23% | +12% | +6% |

TABLE VII 50 mg/kg 2-hydroxy-3-methoxy-5-allyl-N-($\beta$-hydroxyethyl)benzamide

| | Rate of Biliary Flow in ml per 30 Min | | | | | | | |
|---|---|---|---|---|---|---|---|---|
| | Minutes Before | | Minutes after Administration of the Product | | | | | |
| Animals | 30 | 60 | 30 | 60 | 90 | 120 | 150 | 180 |
| 1 | 0.40 | 0.45 | 0.70 | 0.70 | 0.70 | 0.60 | 0.55 | 0.45 |
| 2 | 0.50 | 0.55 | 0.60 | 0.70 | 0.80 | 0.65 | 0.55 | 0.60 |
| 3 | 0.40 | 0.35 | 1.00 | 1.15 | 0.70 | 0.70 | 0.60 | 0.40 |
| 4 | 0.20 | 0.40 | 0.70 | 0.85 | 1.00 | 1.05 | 0.80 | 0.60 |
| 5 | 0.35 | 0.50 | 0.85 | 0.60 | 0.70 | 0.55 | 0.65 | 0.25 |
| 6 | 0.40 | 0.35 | 0.45 | 0.70 | 0.55 | 0.40 | 0.40 | 0.30 |
| Average | 0.40 | | 0.72 | 0.70 | 0.74 | 0.66 | 0.59 | 0.43 |
| Percentage of Variation | | | +80% | +95% | +85% | +65% | +47% | +7% |

TABLE VIII 25 mg/kg DEHYDROCHOLATE OF SODIUM

| | Rate of Biliary Flow in ml per 30 Min | | | | | | | |
|---|---|---|---|---|---|---|---|---|
| | Minutes Before | | Minutes after Administration of the Product | | | | | |
| Animals | 30 | 60 | 30 | 60 | 90 | 120 | 150 | 180 |
| 1 | 0.40 | 0.45 | 0.55 | 0.55 | 0.45 | 0.50 | 0.40 | 0.35 |
| 2 | 0.30 | 0.30 | 0.35 | 0.40 | 0.35 | 0.40 | 0.30 | 0.35 |
| 3 | 0.55 | 0.60 | 0.60 | 0.55 | 0.40 | 0.35 | 0.35 | 0.35 |
| 4 | 0.40 | 0.30 | 0.30 | 0.55 | 0.60 | 0.55 | 0.40 | 0.35 |
| 5 | 0.45 | 0.40 | 0.90 | 0.75 | 0.50 | 0.45 | 0.40 | 0.40 |
| 6 | 0.30 | 0.35 | 0.55 | 0.50 | 0.40 | 0.45 | 0.40 | 0.40 |
| Average | 0.40 | | 0.54 | 0.55 | 0.45 | 0.45 | 0.37 | 0.37 |
| Percentage of variation | | | +35% | +37% | +12% | +12% | −7% | −7% |

TABLE IX

50 mg/kg Dehydrocholate of Sodium

| Before Animals | Rate of Biliary Flow in ml per 30 Min | | | | | | | |
|---|---|---|---|---|---|---|---|---|
| | Minutes | | Minutes after Administration of the Product | | | | | |
| | 30 | 60 | 30 | 60 | 90 | 120 | 150 | 180 |
| 1 | 0.30 | 0.40 | 0.85 | 0.60 | 0.50 | 0.50 | 0.55 | 0.40 |
| 2 | 0.40 | 0.45 | 0.70 | 0.70 | 0.40 | 0.40 | 0.40 | 0.45 |
| 3 | 0.50 | 0.35 | 0.45 | 0.60 | 0.45 | 0.50 | 0.45 | 0.45 |
| 4 | 0.40 | 0.30 | 0.75 | 0.50 | 0.40 | 0.40 | 0.30 | 0.30 |
| 5 | 0.40 | 0.30 | 0.50 | 0.55 | 0.55 | 0.50 | 0.45 | 0.35 |
| 6 | 0.25 | 0.25 | 0.40 | 0.40 | 0.35 | 0.35 | 0.25 | 0.30 |
| Average | 0.35 | | 0.61 | 0.56 | 0.44 | 0.44 | 0.40 | 0.37 |
| Percentage of Variation | | | +74% | +60% | +26% | +26% | +14% | +6% |

Determination of Acute Toxicity:

A. The acute toxicity of 2-hydroxy-3-methoxy-5-allyl-N-(β-hydroxyethyl)-benzamide was determined on Swiss male mice having an average weight of about 20 g. The lethal dosages ($DL_{50}$) were calculated by the method of Dragstedt and Lang.

The product was administered intravenously in solution in propylene glycol diluted to 20 percent with physiologic serum and for the other way the product was administered in suspension in water containing 5 percent gum arabic. The following results were obtained:

| | |
|---|---|
| Intravenous Way | $DL_{50} = 217$ mg/kg |
| Intraperitoneal Way | $DL_{50} = 209$ mg/kg |
| Subcutaneous Way | $DL_{50} = >2$g/kg |
| Oral way | $DL_{50} = >3$g/kg |

Symptomatology:

At elevated dosages, a depressive action was observed and a hypotension which was accompanied by an acceleration of the cardiac frequency and the respiratory rhythm occurred.

B. The acute toxicity of 2-hydroxy-3-methoxy-5-allyl-N-morpholino-benzamide was determined intraperitoneally and subcutaneously under the same conditions. The following results were obtained:

| | |
|---|---|
| Intraperitoneal way | 1 g/kg |
| Subcutaneous Way | >2/g kg |

Various modifications of the compositions and method of the invention may be made without departing from the spirit or scope thereof and it is to be understood that the invention is to be limited only as defined in the appended claims.

We claim:

1. An amide of the formula

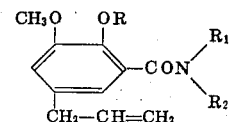

wherein R is selected from the group consisting of hydrogen, methyl and acetyl, $R_1$ and $R_2$ taken together with the nitrogen atom form morpholino, piperidino or pyrrolidino.

2. A compound of claim 1 which is 2-hydroxy-3-methoxy-5-allyl-N-morpholinobenzamide.

3. A compound of claim 1 which is 2-hydroxy-3-methoxy-5-allyl-N-piperidinobenzamide.

4. A compound of claim 1 which is 2-hydroxy-3-methoxy-5-allyl-N-pyrrolidinobenzamide.

* * * * *